US005615509A

United States Patent [19]
Washington

[11] Patent Number: 5,615,509
[45] Date of Patent: Apr. 1, 1997

[54] LINE BREAKER

[76] Inventor: Wayne Washington, 207 W. 8th, Claremore, Okla. 74017

[21] Appl. No.: 505,127

[22] Filed: Jul. 21, 1995

[51] Int. Cl.$^6$ .......................... A01K 97/00; A01K 97/24
[52] U.S. Cl. ................................ 43/4; 43/17.2; 242/405.2
[58] Field of Search .......................... 43/4, 17.2; 81/461, 81/486, 488; 140/123; 242/402, 405, 405.1, 405.2, 405.3, 407

[56] References Cited

U.S. PATENT DOCUMENTS

| 2,684,550 | 7/1954 | Reid | 43/27.4 |
|---|---|---|---|
| 3,171,227 | 3/1965 | Merrill | 43/24 |
| 3,309,038 | 3/1967 | Greaney et al. | 242/405.1 |
| 3,319,904 | 5/1967 | Camlet | 242/405.2 |
| 3,570,163 | 3/1971 | Conder | 43/17.2 |
| 3,803,742 | 4/1974 | Foster | 43/4 |
| 4,032,079 | 6/1977 | Weeks | 242/405.2 |
| 4,075,776 | 2/1978 | Fiebig | 43/24 |
| 4,261,529 | 4/1981 | Sandberg et al. | 242/405.2 |
| 4,301,611 | 11/1981 | Lapinski | 43/18.1 |
| 4,696,121 | 9/1987 | Hernden | 43/17.2 |
| 4,908,974 | 3/1990 | Ortlick et al. | 43/17.2 |
| 4,930,244 | 6/1990 | Enwiller | 43/17.2 |
| 5,216,828 | 6/1993 | Langstone | 43/17.2 |
| 5,452,537 | 9/1995 | Ellison | 43/17.2 |

Primary Examiner—Joseph J. Hail, III
Assistant Examiner—Jay A. Stelacone
Attorney, Agent, or Firm—William S. Dorman

[57] ABSTRACT

A line breaker for pulling a fishing line away from a point of entanglement comprises a horizontally extending tool having a pair of horizontally spaced ends, an upper surface, a lower surface, one of the ends constituting a handle for grasping by a fisherman, a pair of horizontally spaced and vertically projecting pegs extending relatively divergently outwardly from the upper surface of the tool adjacent the other end. The fisherman can wrap a slack portion of the line around the pegs individually and collectively and thereafter pull on the tool in a direction away from the point of entanglement for the purpose of breaking the line away from its entanglement.

2 Claims, 1 Drawing Sheet

LINE BREAKER

BACKGROUND OF THE INVENTION

1. Field of the Invention

The present invention relates to a device or apparatus for breaking or dislodging the end of a fishing line. More particularly this invention relates to a tool which can be used to break a fishing line away from an underwater tangle in such a manner as to minimize the loss of line.

2. The Prior Art

One of the problems in fishing occurs when a fishing line gets snagged or caught on an underwater object such as a sunken tree limb or a rock. At this point, the fisherman has two choices; first, he can cut off the line at any convenient point above the surface of the water; secondly, the fisherman can try to pull the line loose from the obstruction. If the line breaks, the fisherman may save some of the line which would have been lost in the cutting process, but he will undoubtedly lose his lure. On the other hand, some lines are very tough and strong and can cut into the fingers to the bone if the fisherman pulls too hard on the line. This is even true when the fisherman tries to cover his hand with a kerchief or the like; the line has been known to slip off the handkerchief and still cut the hand or fingers. The purpose of this invention is to allow the fisherman to pull on the line with a very strong pull but not subject his fingers, hands or arms to any accidental cutting by the line.

A search was conducted on the present invention and the following listed patents represent the results of the search:

| Patent No. | Inventor | Issue Date |
| --- | --- | --- |
| 3,570,163 | Conder | 03-16-71 |
| 4,696,121 | Hernden | 09-29-87 |
| 4,908,974 | Ortlick et al. | 03-20-90 |
| 4,930,244 | Enwiller | 06-05-90 |

None of the above patents is deemed pertinent to the present invention; however, FIG. 1 of Ortlick et al. does show a line caught on a submerged log.

SUMMARY OF THE INVENTION

The present invention relates to a tool which can be used to break a fishing line away from an underwater tangle in such a manner as to minimize the loss of line. The line breaker comprises a horizontally extending hand held tool, made of wood or plastic or other suitable material and is preferably about 8" to 9" inches in length, and about 1½" to 2" in vertical height. The lower surface of the line breaker is provided with a forwardly curved "trigger" grip so that the fisherman can place his trigger finger in front of and partly around this grip. The rear end of the line breaker constitutes a handle to be grasped by the hand of the fisherman. Along the top of the tool and towards the front end are a pair of short, spaced vertical pegs which extend divergently outwardly.

When using the line breaker or tool of the present invention to dislodge (or break) the remote end of a fishing line away from its entanglement, the fisherman will see to it that there is a slack in the line between the end of the rod and the line breaker. The fisherman will then take the slack of the line and wrap it alternately around the pegs several times ending up with a few figure eights. Then, with his forefinger around the trigger grip and his thumb pressed over the line extending away from the rear peg at a location approximately ½" behind the rear peg, the fisherman can pull directly on the line, with the device pointed directly towards the obstruction, and attempt to dislodge or break the line away from its entanglement. In this manner, the line will not cut into the fisherman's hand, finger or arm and also the fisherman does not need to cut the line near the surface of the water.

DETAILED DESCRIPTION OF THE PREFERRED EMBODIMENTS

Figure 1:
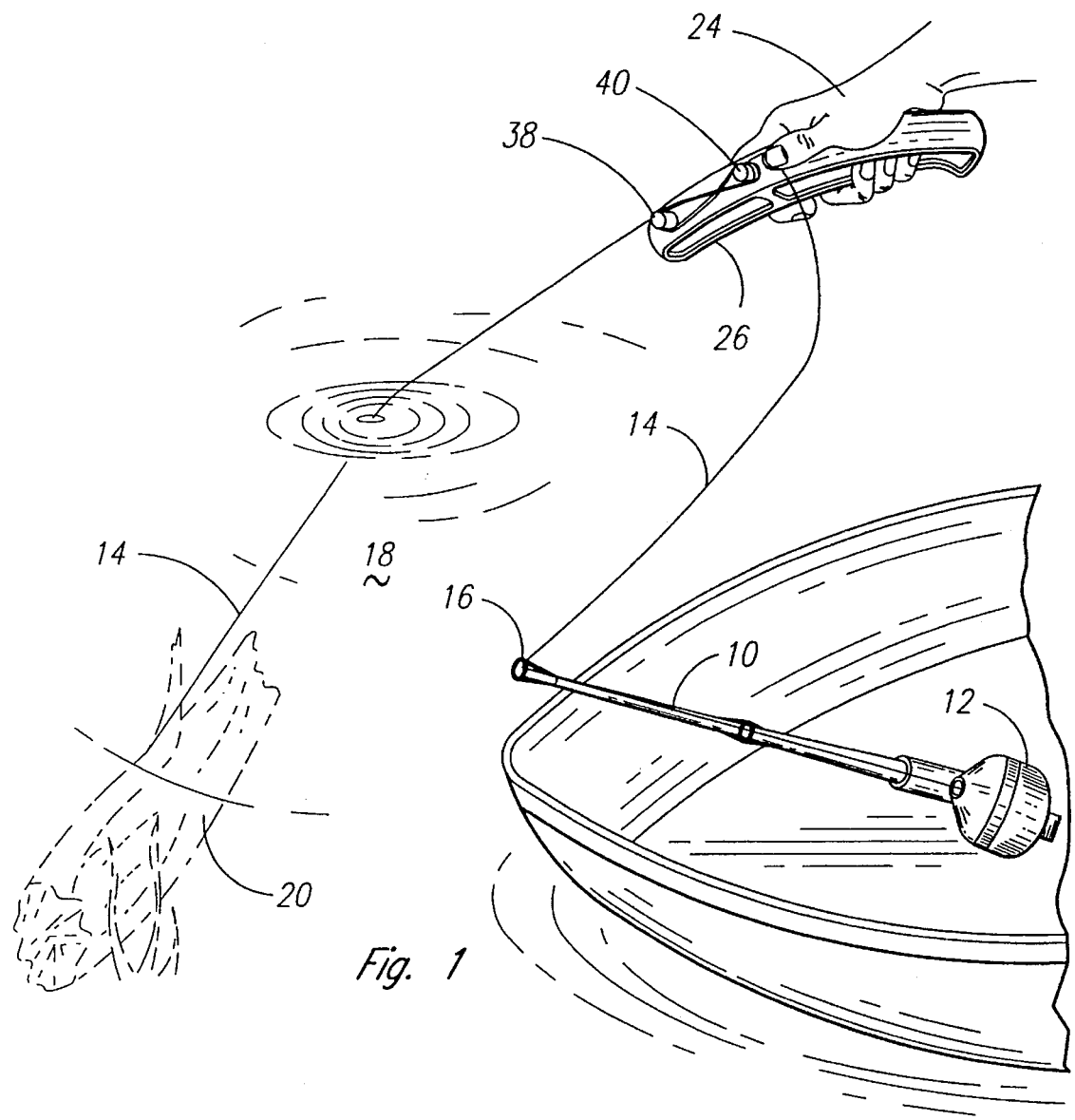
FIG. 1 is a perspective view of a rod and reel together with the line breaker device of the present invention showing a fishing line extending from the line breaker down under the water where the lower end of the line is ensnared on a log.

Referring to the drawings in detail, FIG. 1 shows a fishing rod 10 carrying a reel 12 at its inner end. Fishing line 14 is show extending from the other end of the rod 10, through an eye 16 and into the water 18; below the upper surface of the water, the lower end of the line 14 is shown as caught or snared on a log 20. For the purposes of this explanation, the rod 10 and reel 12 are shown as lying inactive to one side of the fisherman (not shown), the reel having been disengaged to provide slack in the line. The right hand 24 of the fisherman is shown grasping the line breaker device 26 of the present invention.

Figure 2:
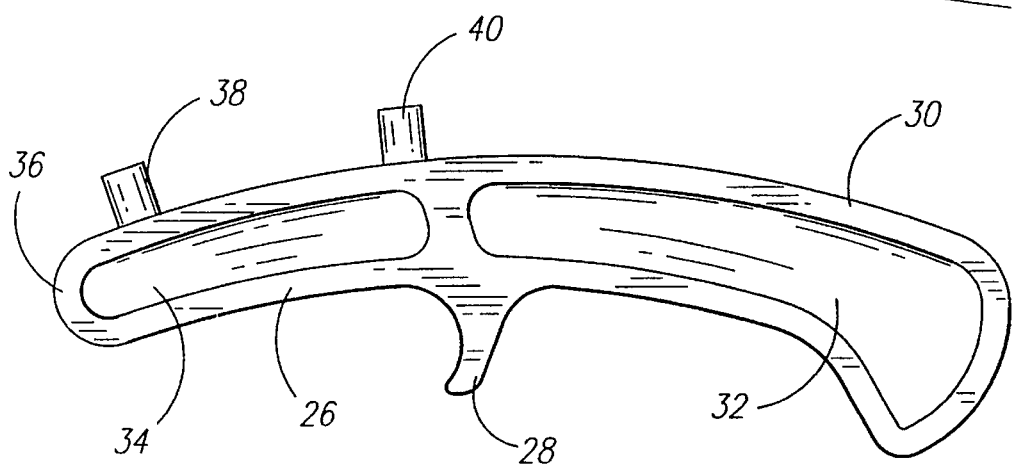
FIG. 2 is a side view of the device of the present invention.

FIG. 2 shows the line breaker device 26 of the present invention in side elevation. The line breaker 26 is a horizontally extending hand held tool, made of wood or plastic or other suitable material and is preferably about 8" to 9" inches in length, and about 1½" to 2" in vertical height. The dimensions set forth herein are merely illustrative and should not be considered as critical or limiting in any way. The lower edge or surface of the line breaker is provided with a stationary and forwardly curved "trigger" grip 28 so that the fisherman can place his trigger finger in front of and partly around this grip 28. The right hand or rear end 30 of the line breaker constitutes a handle for the hand of the fisherman. The line breaker 26 is preferably slightly curved along its length as shown for aesthetic appearances, but it need not necessarily be curved; it could be totally straight. Along the sides (only one side is shown) are a pair of recesses 32 and 34 which are provided to decrease the weight and/or mass of the material used to make the line breaker; again, these recesses are not essential but they do tend to improve the overall appearance of the device.

Along the top of the line breaker 26 and towards the from end 36 (opposite from the handle 30) are a pair of spaced vertical pegs 38 and 40. These pegs are preferably about ½" to ½" in height and they extend preferably divergently outwardly (with respect to each other) from the top edge or surface of the tool 26. As will appear from FIG. 2, the tool is slightly tapered along its length; that is the rear or handle end 30 is slightly greater in vertical dimension than the forward end 36. Also, the forward and rear ends are curved as shown. The shape of the line breaker tool 26 as described above is preferred for aesthetic reasons only and should not be considered as critical or limiting in any way.

The grip 28 is curved along its forward portion so as to receive the forefinger of the fisherman. Also, the grip 28 projects downwardly from the lower surface of the tool essentially midway between the ends thereof.

When using the line breaker 26 of the present invention to dislodge (or break) the remote end of a fishing line away from its entanglement, such as log 20 shown in FIG. 1, the fisherman will see to it that there is a little slack in the line between the rod 10 and the line breaker 26. The fisherman will then take the slack of the line 14 and wrap it alternately around the pegs 38 and 40 ending up with a few figure eights. Then, with his forefinger around the trigger 28 and his thumb pressed over the line behind the peg 40 (about ½" behind the peg), the fisherman can pull directly on the line 14, pointing the device toward the obstruction, so as to attempt to dislodge or break the line 14 away from the log 20. In this manner, the line 14 will not cut into the fisherman's hand, finger or arm and also the fisherman does not need to cut the line near the surface of the water.

The line 14 could be an inexpensive line or it could be one of the more expensive lines, such as those made out of strong plastic material in either monofilament or multifilament form. Fishermen do not like to lose any of their line, especially the expensive variety, because they will have to replace the line after a few mishaps involving cutting of the line. Also, if an expensive lure is attached to the line near the point of the snag, cutting the line will result in the loss of the lure. With the present invention, the fisherman might get "lucky" and have the snag break or the hooks on the lure straighten out, thereby recovering the lure. At least, the fisherman will recover the length of line represented by the distance from the point where he would otherwise have cut the line to the point of the actual break.

What is claimed is:

1. A line breaker for pulling a fishing line away from a point of entanglement comprising a horizontally extending tool having a pair of horizontally spaced ends, an upper surface, a lower surface, one of said ends constituting a handle for grasping by a fisherman, a pair of horizontally spaced pegs projecting upwardly only from the other of said ends and from the upper surface of the tool, the pegs extending upwardly from the upper surface of the tool and divergently relative to one another, whereby the fisherman can wrap a slack portion of the line around the pegs individually and collectively and thereafter pull on the tool in a direction away from the point of entanglement for the purpose of breaking the line away from its entanglement.

2. A line breaker a set forth in claim 1 wherein the lower surface is provided with a downwardly projecting grip located midway between the ends of the tool.

* * * * *